(12) United States Patent
Tanaka et al.

(10) Patent No.: US 7,047,727 B2
(45) Date of Patent: May 23, 2006

(54) RAPID CATALYST WARM-UP CONTROL DEVICE FOR INTERNAL COMBUSTION ENGINE

(75) Inventors: Toshihiko Tanaka, Kariya (JP); Koichi Hoshi, Susono (JP); Takaaki Itoh, Nishima (JP)

(73) Assignees: Denso Corporation, (JP); Toyota Jidosha Kabushiki Kaisha, (JP)

( * ) Notice: Subject to any disclaimer, the term of this patent is extended or adjusted under 35 U.S.C. 154(b) by 0 days.

(21) Appl. No.: 10/853,715

(22) Filed: May 26, 2004

(65) Prior Publication Data

US 2004/0250534 A1    Dec. 16, 2004

(30) Foreign Application Priority Data

May 29, 2003    (JP)    ............................. 2003-151933

(51) Int. Cl.
*F01N 3/00* (2006.01)

(52) U.S. Cl. .......................... 60/284; 60/274; 60/285; 60/300

(58) Field of Classification Search ............... 60/274, 60/284, 285, 300; 123/443

See application file for complete search history.

(56) References Cited

U.S. PATENT DOCUMENTS

| 5,211,011 | A | * | 5/1993 | Nishikawa et al. | ............ 60/284 |
| 5,462,039 | A | * | 10/1995 | Mamiya et al. | ............. 123/686 |
| 5,606,855 | A | * | 3/1997 | Tomisawa | ..................... 60/274 |
| 5,845,492 | A |   | 12/1998 | Isobe et al. | |
| 5,974,788 | A | * | 11/1999 | Hepburn et al. | ............... 60/274 |
| 5,974,792 | A | * | 11/1999 | Isobe | .......................... 60/278 |
| 6,041,591 | A | * | 3/2000 | Kaneko et al. | ............... 60/274 |
| 6,651,422 | B1 | * | 11/2003 | LeGare | ........................ 60/277 |

* cited by examiner

*Primary Examiner*—Tu M. Nguyen
(74) *Attorney, Agent, or Firm*—Nixon & Vanderhye PC

(57) ABSTRACT

A rapid catalyst warm-up control device for an internal combustion engine performs irregular injection dither control during the rapid catalyst warm-up control after starting the engine. In the irregular injection dither control, injection modes are switched after every fuel injection to the cylinders (every 180° CA for a 4-cylinder engine) between a lean injection mode and a rich injection mode in such a pattern that rich injections will not occur consecutively for the same cylinder (dither cycle=540° CA, 900° CA, 1080° CA, or the like). In the lean injection mode, fuel is injected such that the air-fuel ratio is leaner than the stoichiometric ratio, and in the rich injection mode, air-fuel ratio is richer than the stoichiometric ratio. The rich gas emitted from the cylinders where the rich injection has been performed is thus allowed to flow through a different catalyst region every time instead of flowing only through the same region.

10 Claims, 7 Drawing Sheets

FIG. 2

| DITHER CYCLE T (RICH INJECTION CYCLE) / INJECTION CYLINDER | #1 | #3 | #4 | #2 | #1 | #3 | #4 | #2 | #1 | #3 | #4 | #2 | #1 | #3 | #4 | #2 | ... | |
|---|---|---|---|---|---|---|---|---|---|---|---|---|---|---|---|---|---|---|
| 180°CA | R | L | R | L | R | L | R | L | R | L | R | L | R | L | R | L | ... | ✕ |
| 360°CA | R | R | L | L | R | R | L | L | R | R | L | L | R | L | L | L | ... | ✕ |
| 540°CA | R | L | L | R | L | L | R | L | L | R | L | L | R | L | L | R | ... | ○ |
| 720°CA | R | L | L | L | R | L | L | R | L | L | L | R | L | L | L | L | ... | ✕ |
| 900°CA | R | L | L | L | L | R | L | L | L | L | R | L | L | L | L | R | ... | ○ |
| 1080°CA | R | L | L | L | L | L | R | L | L | L | L | L | R | L | L | L | ... | ○ |

{ L : LEAN INJECTION
  R : RICH INJECTION }

CRANK ANGLE →

FIG. 6

L: LEAN INJECTION
R: RICH INJECTION

CRANK ANGLE →

| DITHER CYCLE T (RICH INJECTION CYCLE) / INJECTION CYLINDER | #1 | #3 | #4 | #2 | #1 | #3 | #4 | #2 | #1 | #3 | #4 | #2 | #1 | #3 | #4 | #2 | ... |
|---|---|---|---|---|---|---|---|---|---|---|---|---|---|---|---|---|---|
| EXAMPLE 1 — 540°CA | R | L | L | R | L | L | R | L | L | R | L | L | R | L | L | R | ... |
| EXAMPLE 2 — 900°CA | R | L | L | L | L | R | L | L | L | L | R | L | L | L | L | R | ... |
| EXAMPLE 3 — 1080°CA | R | L | L | L | L | L | L | R | L | L | L | L | L | L | L | L | ... |
| COMPARATIVE EXAMPLE 1 — 720°CA | R | L | L | L | R | L | L | L | R | L | L | L | R | L | L | L | ... |
| COMPARATIVE EXAMPLE 2 — — | L | L | L | L | L | L | L | L | L | L | L | L | L | L | L | L | ... |

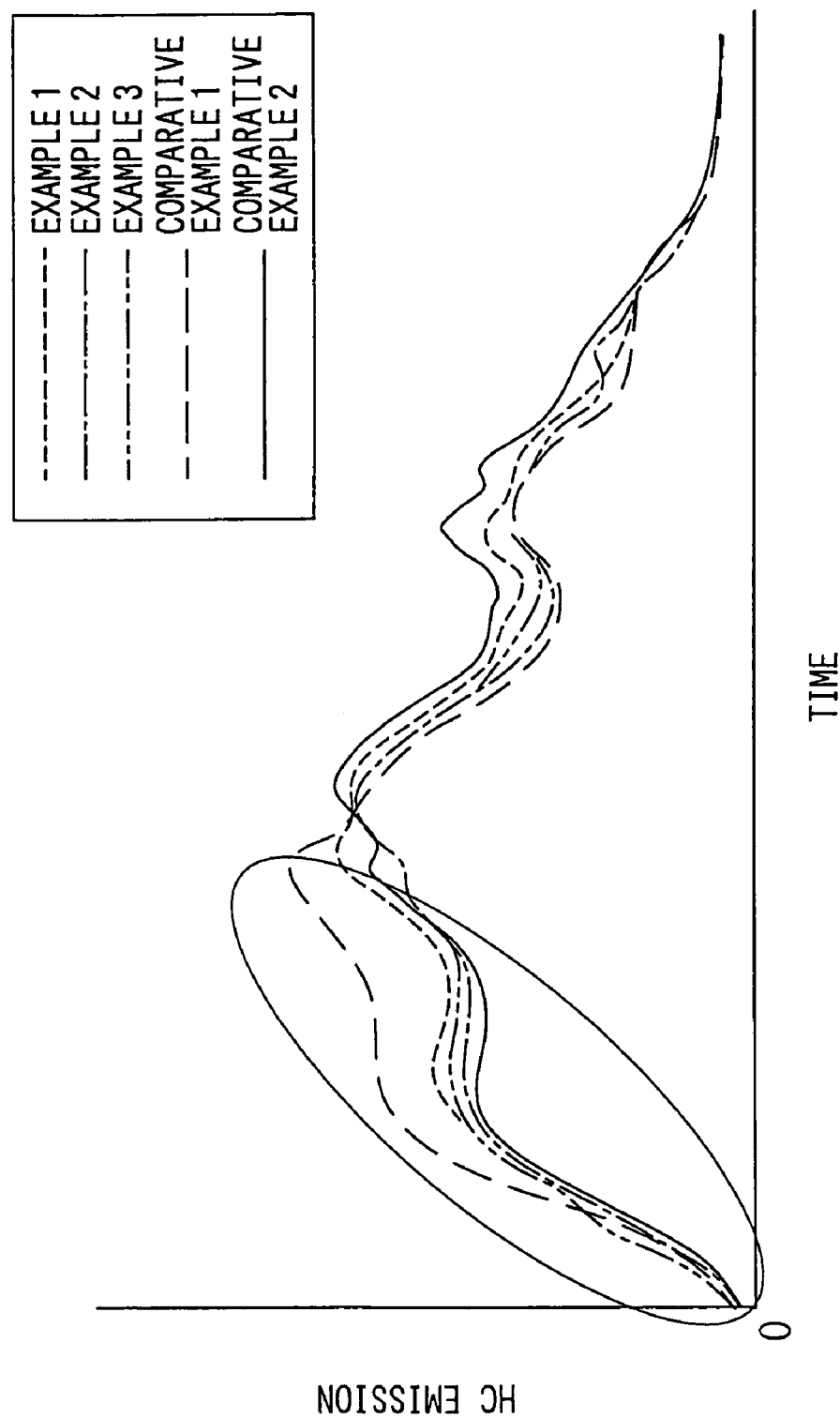

RAPID CATALYST WARM-UP CONTROL DEVICE FOR INTERNAL COMBUSTION ENGINE

CROSS REFERENCE TO RELATED APPLICATIONS

This application is based upon, claims the benefit of priority of, and incorporates by reference Japanese Patent Application No. 2003-151933 filed May 29, 2003.

BACKGROUND OF THE INVENTION

1. Field of the Invention

The present invention relates to a rapid catalyst warm-up control device for rapidly warming up a catalyst used for purifying exhaust gas from an internal combustion engine.

2. Description of the Related Art

In recent years, vehicles having an internal combustion engine have been provided with a catalyst such as three way catalyst for purifying exhaust gas from the internal combustion engine. In such systems, since the exhaust gas purification ratio of the catalyst remains low until the catalyst is warmed up to active temperature after starting the engine, measures are taken to rapidly warm up the catalyst. This is done by performing rapid catalyst warm-up control until the catalyst reaches its active temperature after starting up the internal combustion engine.

An example of this rapid catalyst warm-up control is such that injection dither control is performed to increase/decrease, and thereby correct, the fuel injection quantity to switch the injection mode between rich injection in which the air-fuel ratio is rich and lean injection in which the air-fuel ratio is lean, for example, for every injection (every 180° CA in case of a 4-cylinder engine). By doing so, the internal combustion engine is caused to discharge alternately rich gas with a high concentration of HC and CO and lean gas with a high concentration of $O_2$ so that the rich and lean gases are mixed in the catalyst to create an oxidation reaction of the rich components (HC and CO). Accordingly, the catalyst is warmed up efficiently from the inside thereof by the heat of such a reaction.

According to the conventional rapid catalyst warm-up control technology using the injection dither control, the oxidation reaction of the rich components is not accelerated enough in the catalyst during the period when the catalyst temperature is low, which is immediately after starting the engine. This leads to occurrence of a phenomenon of "slip-through of the rich components" or "pass-through of the rich components" in which the rich components contained in the rich gas are directly discharged by slipping through the catalyst, and this constitutes a factor of increasing the emission of exhaust gas during start-up of the engine.

To cope with this problem, Japanese Patent Laid-Open Publication No. Hei 9-88564 (1997) (page 2 and so on) discloses a rapid catalyst warm-up control technique. According to the technique, after starting the engine, an ignition timing retarding control is first performed to raise the temperature of the exhaust gas and to warm up the catalyst by the heat of the exhaust gas. Then as soon as the catalyst temperature is increased to a certain degree, the control is switched to the injection dither control to accelerate the oxidation reaction of rich components in the catalyst and to efficiently warm up the catalyst from the inside thereof by using the reaction heat thus obtained.

According to the rapid catalyst warm-up control technique disclosed in the above-mentioned publication, however, the injection dither control is started only after the catalyst temperature has been increased to a certain degree by the ignition timing retarding control, meaning that the start of the injection dither control is delayed, and the warm-up of the catalyst is also delayed by that much.

SUMMARY OF THE INVENTION

The present invention has been made in view of the foregoing. Accordingly, it is an object of the present invention to provide a rapid catalyst warm-up control device for an internal combustion engine. The control device is capable of warming up the catalyst by performing injection dither while preventing rich components in the catalyst from slipping through the catalyst even during the period when the catalyst temperature is still low, such as the case immediately after starting the engine, and permits realization of both the decrease of exhaust gas emission immediately after the start-up and improvement in rapid catalyst warm-up performance. The control facilitates the mixing of the rich and lean gases to accelerate the oxidation reaction of the rich components in the catalyst.

In order to achieve the foregoing object, a rapid catalyst warm-up control device for an internal combustion engine according to a first aspect of the present invention is designed to rapidly warm up a catalyst by performing, after start-up of the internal combustion engine, an irregular injection dither control. The control uses a rapid catalyst warm-up control means for switching injection modes between a lean injection mode in which fuel is injected such that the air-fuel ratio is leaner than the stoichiometric ratio, and a rich injection mode in which fuel is injected such that the fuel-ratio is richer than the stoichiometric ratio, in such a pattern that the rich injections do not occur consecutively for the same cylinder.

Generally, exhaust gas emitted from each of the cylinders of the internal combustion engine is not necessarily distributed all over the cross section of the flow path in a catalyst when flowing through the catalyst. Since exhaust gases emitted from different cylinders flow in different conditions depending on the order of arrangement or order of combustion of the cylinders, shapes of exhaust manifolds, and the like, the exhaust gases emitted from the cylinders tend to flow only through respective limited regions in the cross section of the flow path in the catalyst. This means that exhaust gas emitted from a particular cylinder tends to flow only through the same and limited region of the catalyst.

Therefore, if the injection dither control is performed in such a cycle that rich injection occurs consecutively for the same cylinder, rich gas emitted from the corresponding cylinder after every rich injection will flow through a same limited region in the catalyst and hence it becomes impossible to efficiently mix rich and lean gases in the catalyst. Accordingly, oxidation reaction of rich components cannot be accelerated enough in the catalyst during the period when catalyst temperature is low immediately after starting of the engine. Also, the quantity of rich components slipping through the catalyst is likely to be increased.

According to the present invention, this problem is overcome by performing irregular injection dither control for switching injection modes between lean and rich injection modes in such a pattern that rich injections do not occur consecutively for the same cylinder. In this manner, rich gas emitted from the cylinder after rich injection is permitted to flow through a different region in the catalyst (where lean gas has been flowing till then) instead of flowing through the same limited region and hence it is possible to mix rich and lean gases efficiently in the catalyst. Consequently, even during a period when catalyst temperature is low, such as immediately after start-up of the engine, injection dither can be performed in an early stage to warm up the catalyst, while accelerating the oxidation reaction of rich components in the catalyst to prevent the pass-through of the rich components. It is thus possible to realize both, a decrease of exhaust gas emission immediately after start-up of the engine, and improvement in rapid catalyst warm-up performance.

According to a second aspect of the invention, lean injection is preferably performed first when starting the irregular injection dither control. By doing so, when the irregular injection dither control is started, rich gas can be introduced into the catalyst where lean gas has been already introduced by the lean injection previously performed. In this manner, a reliable mixture of lean and rich gases in the catalyst can be ensured from the very first rich injection after starting the irregular injection dither control. This also makes it possible to prevent the rich components from slipping through the catalyst from the very first rich injection.

Further, according to a third aspect of the present invention, a larger number of lean injections may be performed than rich injections during the irregular injection dither control. By doing so, since rich gas can be mixed with lean gas more efficiently, oxidation reaction of the rich components can be accelerated further and the pass-through of the rich components can be prevented more reliably.

Further, according to a fourth aspect of the present invention, ignition timing for a cylinder for which a rich injection is to be performed may be retarded during the irregular injection dither control. By doing so, the temperature of the rich gas emitted from the cylinder for which the rich injection has been performed can be raised by the ignition timing retarding to make it possible to accelerate the oxidation reaction of the rich components in the catalyst and to more reliably prevent the pass-through of the rich components. If the extent of the ignition timing retardation is made larger, the rich gas temperature can be raised further to cause after-burning of exhaust gas in the exhaust pipe upstream of the catalyst, and thus the effects of rapidly warming up the catalyst can be further enhanced by the heat of the after-burning.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a time chart of irregular injection dither control;

FIG. 6 is a time chart of the injection control methods during rapid catalyst warm-up control for Examples 1 to 3 and Comparative Examples 1 and 2;

FIG. 8 is a time chart exhibiting behaviors of HC emission amounts after start-up of the engine for Examples 1 through 3 and Comparative Examples 1 and 2.

DETAILED DESCRIPTION OF THE PREFERRED EMBODIMENTS

Figure 1:
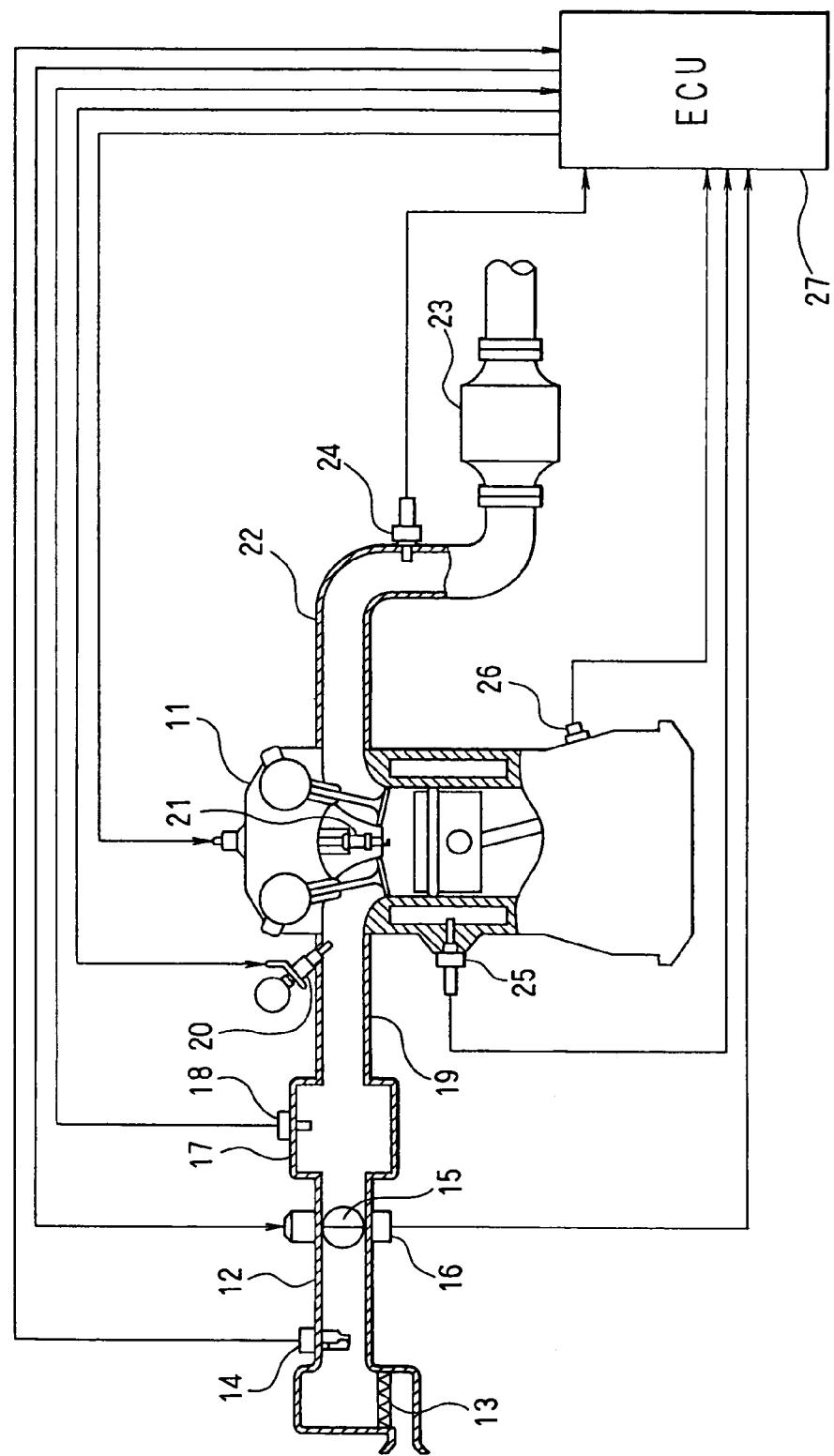
FIG. 1 is a partial cross-sectional diagram of an overall structure of an engine control system according to an embodiment of the present invention.

The following description of the preferred embodiments is merely exemplary in nature and is in no way intended to limit the invention, its application, or uses.

An embodiment of the present invention will now be described with reference to the drawings. First, the schematic structure of an entire engine control system will be described based on FIG. 1. An in-line 4-cylinder engine 11 constituting the internal combustion engine has four cylinders, a first cylinder #1 to a fourth cylinder #4. An air cleaner 13 is provided at the most upstream portion of an intake pipe 12 of the engine 11, and an air flow meter 14 is provided downstream of the air cleaner 13 for detecting an intake air amount. At the downstream side of the air flow meter 14, there are provided a throttle valve 15 whose opening degree is adjusted by a DC motor or the like and a throttle opening sensor 16 for detecting a throttle opening degree.

Further, a surge tank 17 is provided downstream of the throttle valve 15. This surge tank 17 is provided with an intake pipe pressure sensor 18 for detecting an intake pipe pressure. The surge tank 17 is also provided with an intake manifold 19 for introducing air into the respective cylinders of the engine 11. A fuel injection valve 20 for injecting fuel is attached in the vicinity of an intake port of the intake manifold 19 of each of the cylinders. An ignition plug 21 is attached to the cylinder head of each cylinder so that the fuel-air mixture in the cylinder is ignited by a spark discharge of the ignition plug 21.

On the other hand, a catalyst 23 such as a three-way catalyst for purging CO, HC, NOx and the like from the exhaust gas is provided in an exhaust pipe 22 of the engine 11. An exhaust gas sensor 24 (constituted by an air-fuel ratio sensor, oxygen sensor or the like) is provided upstream of the catalyst 23 for detecting an air-fuel ratio of exhaust gas or rich/lean exhaust gas. Further, in the cylinder block of the engine 11, there is mounted a water temperature sensor 25 for detecting the temperature of cooling water and a crank angle sensor 26 for outputting a pulse signal every time the crank shaft of the engine 11 rotates through a predetermined crank angle (e.g. 30° CA). The crank angle, engine speed, and so on are detected based on an output signal from the crank angle sensor 26.

Outputs from the various sensors described above are input to an engine control unit 27 (hereinbelow to be referred to as "ECU"). The ECU 27, constituted mainly by a microcomputer, executes various engine control programs stored in a built-in ROM (storage medium) to control the fuel injection quantity determined by the opening degree of the fuel injection valve 20, and the ignition timing of the ignition plug 21.

During such an operation, the ECU 27 executes various programs for the fuel injection control as described later so that rapid catalyst warm-up control is performed by using irregular injection dither control until the warm-up of the catalyst 23 is completed after start-up of the engine. In irregular injection dither control, as shown in the columns indicated by a circle in FIG. 2, the injection modes are switched between the lean injection mode and the rich injection mode upon every cylinder injection (every 180° CA in case of the 4-cylinder engine 11) in such a pattern that the rich injections will not occur consecutively for the same cylinder. In the lean injection mode, fuel is injected such that the air-fuel ratio is leaner than the stoichiometric ratio. In the rich injection mode, fuel is injected such that the air-fuel ratio is richer than the stoichiometric ratio.

For example, in case of the 4-cylinder engine 11, as shown in the columns indicated by a circle in FIG. 2, the rich injections do not occur consecutively for the same cylinder if the cycle of rich injection is set to any of 540° CA, 900° CA, 1080° CA, and the like. Therefore, the cycle of the rich injection may be set to any of 540° CA, 900° CA, 1080° CA, and the like. As shown in the columns indicated by an "X" in FIG. 2, the rich injections do occur consecutively for the same cylinder if the cycle of rich injection is set to 180° CA, 360° CA, 720° CA, or the like. Therefore, the cycle of rich injection should not be set to 180° CA, 360° CA, 720° CA or the like.

Figure 3:
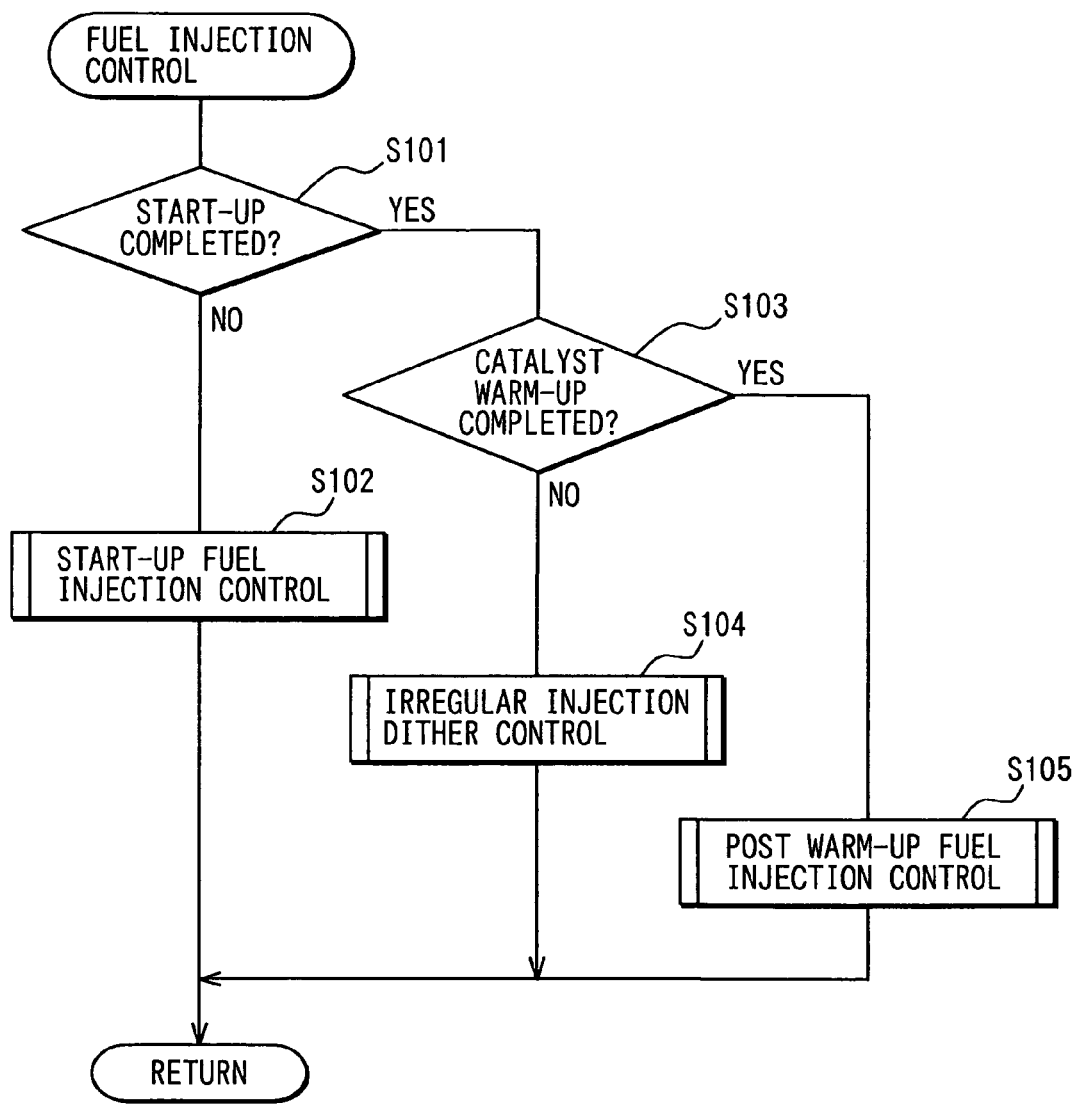
FIG. 3 is a flow chart of the flow of processing by a fuel injection control program.

Hereinafter, particulars of processing of each program for the fuel injection control executed by the ECU 27 in the present embodiment will be described. The fuel injection control program as shown in FIG. 3 is executed, for example, for every fuel injection (every 180° CA in the case of the 4-cylinder engine 11). When this program is activated, it is first determined in step S101 whether the start-up of the engine has been completed or not based, for example, on whether the engine speed has exceeded the criteria value for judging complete combustion.

If it is determined that the start-up has not been completed (in the course of start-up), the processing proceeds to step S102. In step S102, the start-up fuel injection control is performed so that the fuel injection quantity is set such that the air-fuel ratio for the start-up (e.g. stoichiometric or rich air-fuel ratio) is established, and the time for opening the fuel injection valve 20 (injection time) of the cylinders is controlled so as to obtain such fuel injection quantity.

Thereafter, the processing proceeds to step S103 when it is determined that the start-up has been completed in step S101 above. In this step S103, it is determined whether warm-up of the catalyst 23 has been completed or not, based for example, on whether the temperature of the cooling water has exceeded a predetermined criteria value.

If it is determined that the warm-up of the catalyst 23 has not been completed, the processing proceeds to step S104. In step S104, the irregular injection dither control program of FIG. 4, as described later, is executed to perform the irregular injection dither control in which the injection modes are switched between the lean injection mode and rich injection mode in such a pattern that the rich injections will not occur consecutively for the same cylinder. Thereby, the catalyst 23 is rapidly warmed.

Thereafter, when it is determined that the warm-up of the catalyst 23 has been completed in step S103 above, the processing proceeds to step S105 where post-warm-up injection control is performed to set the fuel injection quantity such that the air-fuel ratio of exhaust gas becomes a target air-fuel ratio (e.g. stoichiometric ratio). Then, the time for opening the fuel injection valve 20 (injection time) of the cylinders is controlled so as to obtain the set fuel injection quantity.

Figure 4:
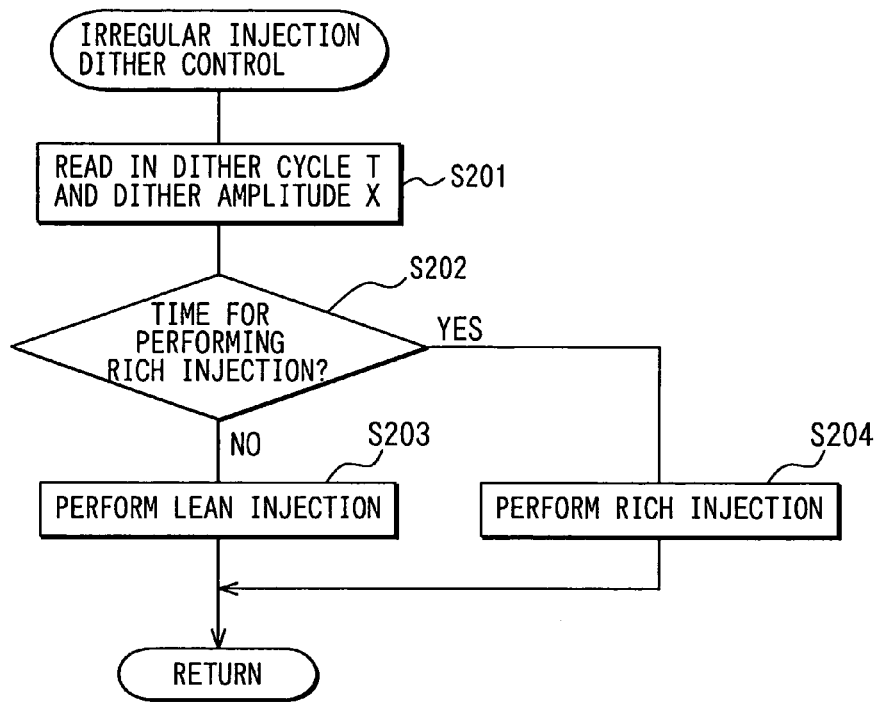
FIG. 4 is a flow chart of the flow of processing by an irregular injection dither control program.

On the other hand, the irregular injection dither control program as shown in FIG. 4 is activated in step S104 of FIG. 3 and serves as a rapid catalyst warm-up controlling means as defined in the claims. When this program is activated, first, in step S201, a dither cycle T and a dither amplitude X of the irregular injection dither control are read in. In this case, by using the air-fuel ratio of lean injection as a base air-fuel ratio (this means that the base air-fuel ratio is closer to the lean side than to the stoichiometric air-fuel ratio during the irregular injection dither control). Further, the dither cycle T, that is, a cycle of rich injections, is set to such a crank angle that rich injections will not occur consecutively for the same cylinder and the number of rich injections is larger than the number of lean injections (in the case of 4-cylinder engine 11, the cycle is set, for example, to 540° CA, 900° CA, 1080° CA, and the like). In addition, the dither amplitude X is set as an amplitude from the base air-fuel ratio (lean injection air-fuel ratio).

After that, the processing proceeds to step S202, where it is determined whether the timing is for performing a rich injection or not according, for example, to whether lean injections have been performed consecutively for a predetermined number of times according to the dither cycle T (rich injection cycle). Consequently, if the irregular injection dither control is started, then the lean injection is performed first.

In step S202, if it is determined that the timing is not such for performing a rich injection, namely that the timing is for performing a lean injection, the processing proceeds to step S203, where the lean injection control is performed. During the lean injection control, the lean fuel injection quantity is set such that the air-fuel ratio becomes lean (e.g. A/F=15.5), and the fuel injection valve 20 of the corresponding cylinder is controlled so as to obtain the set lean fuel injection quantity.

Thereafter, when lean injection has been performed for the predetermined number of times according to the dither cycle T (rich injection cycle) and it is determined in step S202 above that the timing is appropriate for performing a rich injection, the processing proceeds to step S204 where a rich injection is performed. During this rich injection, the air-fuel ratio for the rich injection is set on the basis of the base air-fuel ratio (lean injection air-fuel ratio), the dither amplitude X to set the fuel injection quantity. Then, the time of opening the fuel injection valve 20 (injection time) of the corresponding cylinder is controlled so as to attain this rich fuel injection quantity. Further, during the rich injection, the ignition timing is retarded by a predetermined value (e.g. 5° CA) so that the temperature of the exhaust gas (rich gas) is raised.

In the manner as described above, the catalyst 23 is rapidly warmed up by performing irregular dither control, for the period from completion of start-up of the engine until completion of warm-up of the catalyst 23, in which the lean injection is repeated for every injection of the cylinders (every 180° CA in the case of the 4-cylinder engine 11) while rich injection is performed intermittently at such a cycle that will not occur consecutively for the same cylinder.

Although the air-fuel ratio of lean injection is used as the base air-fuel ratio and the dither amplitude X is set as an amplitude from the base air-fuel ratio (air-fuel ratio of lean injection) in their regular injection dither control program of FIG. 4, the present invention is not limited thereto. It is also possible that the base air-fuel ratio is set, for example, to the stoichiometric ratio, and the dither amplitude from the base air-fuel ratio during the lean injection and the dither amplitude from the base air-fuel ratio during the rich injection are set to set the air-fuel ratio during the lean injection and the air-fuel ratio during the rich injection.

In general, exhaust gas emitted from each of the cylinders of the engine 11 is not necessarily distributed all over the cross section of the flow path in the catalyst 23 when flowing therethrough. The flow condition of exhaust gas from the cylinders varies in accordance with the order of arrangement or order of combustion of the cylinders, shapes of the exhaust manifolds, and so on, and hence exhaust gases emitted from the cylinders tend to flow only through respective limited regions in the cross section of the flow path in the catalyst 23. In other words, exhaust gas emitted from the same cylinder tends to always flow only through the same limited region in the catalyst 23.

Figure 5:
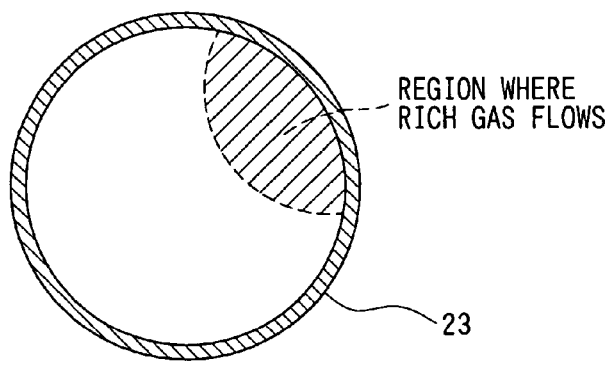
FIG. 5 is a cross-sectional view of a catalyst showing the state in which rich gas flows through a limited region in the catalyst in a maldistributed manner.

For this reason, when the injection dither control is performed at such a cycle that rich injection occurs consecutively for the same cylinder, as shown in FIG. 5, the rich gas emitted from the cylinder for which the rich injection has been performed will always flow only through the same limited region in the catalyst 23 in a maldistributed manner. Therefore, the rich gas and lean gas cannot be efficiently mixed in the catalyst 23. As a result, during the period when the catalyst temperature is low, immediately after start-up of the engine, the oxidation reaction of the rich components cannot be accelerated enough in the catalyst 23 and thus the quantity of rich components slipping through the catalyst tends to be increased.

In contrast, according to the present embodiment, the irregular injection dither control is performed to switch over the injection modes between lean and rich injection modes in such a pattern that rich injections do not occur consecutively for the same cylinder. According to this control, the rich gas emitted from the cylinder for which the rich injection has been performed is allowed to flow through different regions (regions where lean gas has been flowing till then), every time, instead of always flowing only through the same limited region in the catalyst 23. Therefore, the rich gas and the lean gas can be efficiently mixed in the catalyst 23. As a result, even during the period when the catalyst temperature is low, such as immediately after engine start-up, the injection dither control can be performed in an early stage to warm up the catalyst 23 while preventing the "slip through" of the rich components by accelerating the oxidation reaction of the rich components in the catalyst 23. Thus, it is possible to realize both the decrease of exhaust emission immediately after the start-up of the engine and the improvement in rapid catalyst warm-up performance.

The present inventors conducted tests to evaluate the effects of the irregular injection dither control for raising the catalyst temperature and decreasing HC emission. The results of the tests will now be described with reference to FIGS. 6 through 8.

Figure 7:
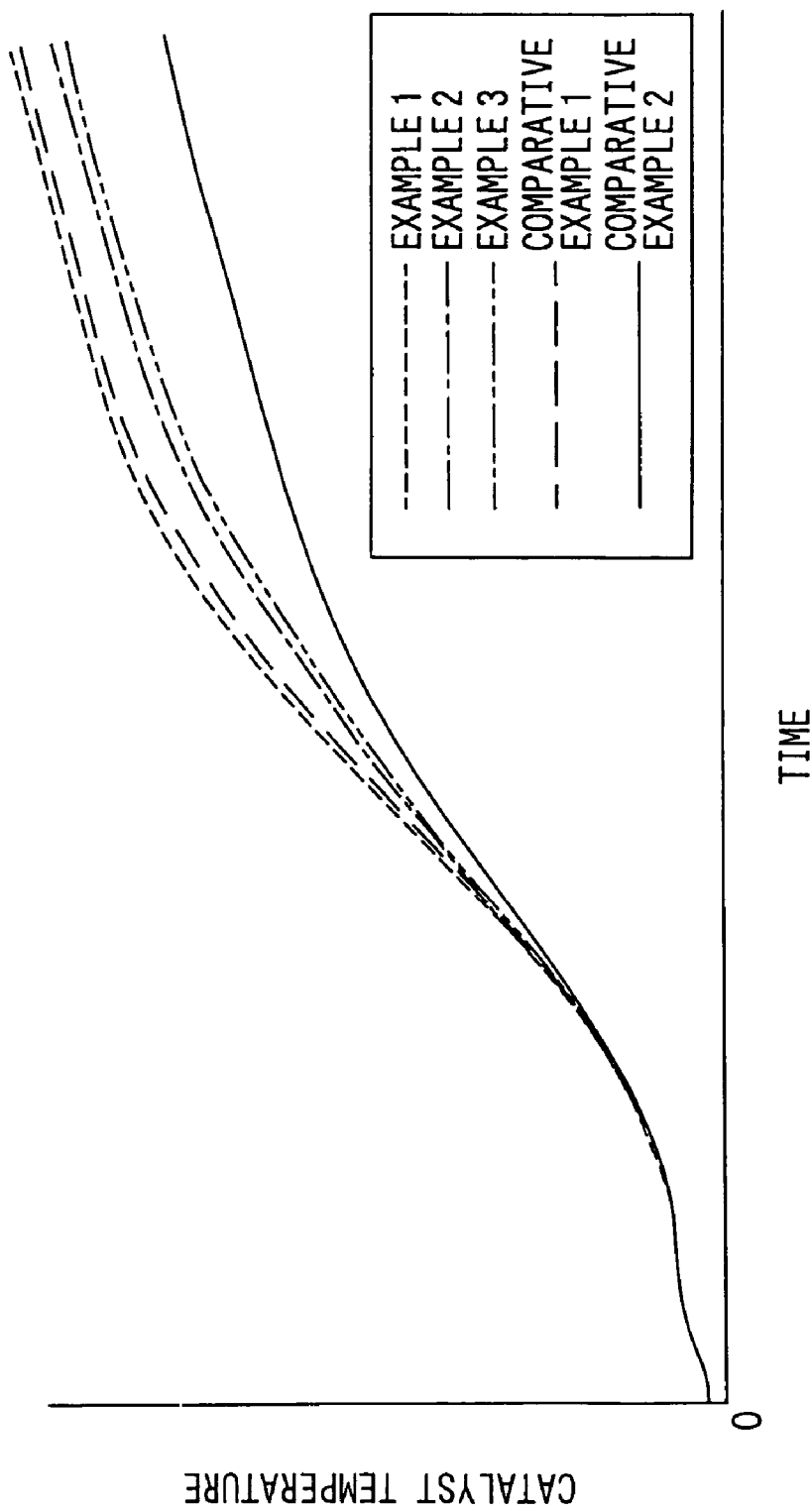
FIG. 7 is a time chart exhibiting behaviors of catalyst temperature after start-up of the engine for Examples 1 to 3 and Comparative Examples 1 and 2.

FIG. 6 is a time chart showing injection control methods during the rapid catalyst warm-up control in Examples 1 to 3 and Comparative Examples 1 and 2. FIG. 7 is a time chart showing behaviors of catalyst temperatures after start-up of the engine in Examples 1 to 3 and Comparative Examples 1 and 2. FIG. 8 is a time chart showing behaviors of HC emission amounts after start-up of the engine in Examples 1 to 3 and Comparative Examples 1 and 2.

As shown in the time chart of FIG. 6, Examples 1 to 3 are examples in which the dither cycle T (rich injection cycle) was set to 540° CA, 900° CA, and 1080° CA, respectively, and the irregular injection control was performed such that rich injections did not occur consecutively for the same cylinder. On the other hand, Comparative Example 1 is an example in which the dither cycle T (rich injection cycle) was set to 720° CA and the injection dither control was performed such that rich injections did occur consecutively for the same cylinder. Comparative Example 2 is an example of ordinary lean control in which the lean injection (air-fuel ratio=base air-fuel ratio) was performed for every fuel injection without performing the injection dither control.

As is obvious from the time chart of FIG. 7, the irregular injection dither control of the Examples 1 to 3, and the injection dither control of Comparative Example 1 are all capable of, by using the injection dither, creating oxidation reaction of the rich components in the catalyst 23 and warming up the catalyst 23 efficiently from the inside thereof. Hence they are capable of providing a higher effect for raising the catalyst temperature compared to Comparative Example 2 in which injection dither is not involved.

However, as is obvious from the time chart of FIG. 8, the injection dither control of Comparative Example 1 in which rich injections occur consecutively for the same cylinder, is not able to accelerate the oxidation reaction of the rich components in the catalysts 23 enough during the period when catalyst temperature is still low immediately after start-up of the engine. Therefore, a larger quantity of rich components is allowed to slip through the catalyst to increase the HC emission compared to Comparative Example 2.

In contrast, it has been confirmed that the irregular injection dither control of Examples 1 to 3, in which rich injections do not occur consecutively for the same cylinder, is capable of accelerating the oxidation reaction of the rich components in the catalyst 23 even during the period when catalyst temperature is low immediately after start-up of the engine. Hence, the control of Examples 1 to 3 is capable of decreasing the HC emission by suppressing the pass-through of the rich components to a substantially same extent as Comparative Example 2 in which no rich injection was performed.

Further, according to the present embodiment, since a lean injection is performed prior to a rich injection when starting the irregular injection dither control, it is possible to introduce rich gas into the catalyst 23 in the condition where lean gas has already been introduced. Therefore, from the very first rich injection after starting the irregular injection dither control, the rich gas can be mixed reliably with the lean gas in the catalyst 23 and the rich components slipping through the catalyst can be decreased from the very first rich injection.

Further, according to the present embodiment, since the number of lean injections is larger than the number of rich injections during the irregular injection dither control, the rich gas can be mixed with the lean gas more efficiently to further accelerate the oxidation reaction of the rich components, and thus the rich components slipping through the catalyst can be decreased further more.

Still further, according to the present embodiment, the ignition timing of a cylinder for which a rich injection is performed is retarded during their regular injection dither control. Thereby, the temperature of the rich gas emitted from the cylinder for which the rich injection has been performed can be raised to further accelerate the oxidation reaction of the rich components in the catalyst 23. Furthermore, the pass-through of the rich components can be prevented more reliably. The extent of retarding the ignition timing can be increased to further raise the temperature of the rich gas and to cause after-burning of exhaust gas in the exhaust pipe 22 upstream of the catalyst 23, so that the effect of rapidly warming up the catalyst 23 can be enhanced more by the heat of the after-burning.

It should be noted that the present invention may be practiced otherwise than specifically described above. For example, when starting the irregular injection dither control, a rich injection may be performed prior to a lean injection, or the ignition timing of a cylinder to perform rich injection may not be retarded. Further, although in the embodiment as described above, the rich injection is performed periodically during the irregular injection dither control, the rich injection may be performed in an irregular pattern. An important aspect is that the rich injection should be performed in such a pattern that rich injections do not occur consecutively for the same cylinder.

The present invention is not limited to a system in which one catalyst is provided to an exhaust pipe, and may be applied to a system in which a plurality of catalysts are provided to an exhaust pipe. Further, the present invention is not limited to a 4-cylinder engine, and is also applicable to engines with at most three cylinders or with at least five cylinders. The present invention is not limited to an intake port injection engine as shown in FIG. 1, and is also applicable to a cylinder injection engine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for rapidly warming a catalyst for purifying exhaust gas from an internal combustion engine, the method comprising:

performing irregular injection dither control after start-up of the internal combustion engine to rapidly warm said catalyst, the irregular injection dither control irregularly switching injection modes between a lean injection mode in which fuel is injected such that air-fuel ratio is leaner than a stoichiometric ratio and a rich injection mode in which fuel is injected such that a fuel-ratio is richer than a stoichiometric ratio, wherein the irregular injection dither control irregularly switches the injection modes in at least one cylinder so that there are more lean injections than rich injections in said at least one cylinder during the irregular injection dither control, and the irregular dither control irregularly switches injection modes in such a pattern that the rich injections do not occur consecutively for the same cylinder, in any of the cylinders, during the irregular injection dither control.

2. The method as in claim 1, wherein:
the irregular injection dither control performs a lean injection first, at the start of the irregular injection dither control.

3. The method as in claim 1, wherein:
the irregular injection dither control performs a larger number of lean injections than rich injections in each cylinder.

4. The method as in claim 1, wherein:
the irregular injection dither control retards ignition timing for a cylinder for which a rich injection is to be performed during the irregular injection dither control.

5. The method as in claim 1, wherein the irregular injection dither control is stopped when a temperature of cooling water of the engine exceeds a predetermined temperature.

6. An apparatus for an internal combustion engine that rapidly warms a catalyst for purifying exhaust gas from the internal combustion engine, the apparatus comprising:

a rapid catalyst warming control device that performs an irregular injection dither control after start-up of the internal combustion engine to rapidly warm said catalyst, the irregular injection dither control irregularly switching injection modes between a lean injection mode in which fuel is injected such that air-fuel ratio is leaner than a stoichiometric ratio and a rich injection mode in which fuel is injected such that a fuel-ratio is richer than a stoichiometric ratio, wherein the irregular injection dither control irregularly switches the injection modes in at least one cylinder so that there are more lean injections than rich injections in said at least one cylinder during the irregular dither control, and the irregular injection dither control irregularly switches injection modes in such a pattern that the rich injections do not occur consecutively for the same cylinder, in any of the cylinders, during the irregular injection dither control.

7. The apparatus for an internal combustion engine according to claim 6, wherein the rapid catalyst warm-up control device performs a lean injection first when starting the irregular injection dither control.

8. The apparatus for an internal combustion engine according to claim 6, wherein the rapid catalyst warm-up control device performs a larger number of lean injections than rich injections in each cylinder during the irregular injection dither control.

9. The apparatus for an internal combustion engine according to claim 6, wherein the rapid catalyst warm-up control device retards ignition timing for a cylinder for which a rich injection is to be performed during the irregular injection dither control.

10. The apparatus as in claim 6, wherein the rapid catalyst warming control device is adapted to stop the irregular injection dither control once a temperature of cooling water of the engine exceeds a predetermined temperature.

* * * * *

UNITED STATES PATENT AND TRADEMARK OFFICE
CERTIFICATE OF CORRECTION

PATENT NO. : 7,047,727 B2
APPLICATION NO. : 10/853715
DATED : May 23, 2006
INVENTOR(S) : Tanaka et al.

It is certified that error appears in the above-identified patent and that said Letters Patent is hereby corrected as shown below:

On the Title Page;

"(75) Inventors: Toshihiko Tanaka, Kariya (JP); Koichi Hoshi, Susono (JP); Takasaki Itoh, Nishima (JP)"

should be

--(75) Inventors: Toshihiko Tanaka, Kariya (JP); Koichi Hoshi, Susono (JP); Takasaki Itoh, Mishima (JP)--.

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,047,727 B2
APPLICATION NO. : 10/853715
DATED : May 23, 2006
INVENTOR(S) : Tanaka et al.

It is certified that error appears in the above-identified patent and that said Letters Patent is hereby corrected as shown below:

On the Title Page;

"(75) Inventors: Toshihiko Tanaka, Kariya (JP); Koichi Hoshi, Susono (JP); Takaaki Itoh, Nishima (JP)"

should be

--(75) Inventors: Toshihiko Tanaka, Kariya (JP); Koichi Hoshi, Susono (JP); Takaaki Itoh, Mishima (JP)--.

Signed and Sealed this

Twenty-second Day of May, 2007

JON W. DUDAS
*Director of the United States Patent and Trademark Office*